United States Patent
Cordani

(10) Patent No.: US 6,315,213 B1
(45) Date of Patent: Nov. 13, 2001

(54) METHOD OF MODIFYING WEATHER

(76) Inventor: Peter Cordani, 1374 N. Killian Dr., Lake Park, FL (US) 33403

( * ) Notice: Subject to any disclaimer, the term of this patent is extended or adjusted under 35 U.S.C. 154(b) by 0 days.

(21) Appl. No.: 09/598,660

(22) Filed: Jun. 21, 2000

(51) Int. Cl.$^7$ .................................................. A01G 15/00
(52) U.S. Cl. .......................... 239/2.1; 239/14.1; 252/194
(58) Field of Search ..................................... 239/2.1, 14.1; 252/194

(56) References Cited

U.S. PATENT DOCUMENTS

| | | | |
|---|---|---|---|
| 2,903,188 | * | 9/1959 | Hutchinson ............................ 239/2.1 |
| 3,608,810 | * | 9/1971 | Kooser .................................. 239/2.1 |
| 3,659,785 | * | 5/1972 | Nelson et al. ......................... 239/2.1 |
| 3,690,552 | * | 9/1972 | Plump et al. ......................... 239/14.1 |
| 3,896,993 | * | 7/1975 | Serpolay .............................. 239/12.1 |
| 4,096,005 | | 6/1978 | Slusher ................................... 149/18 |
| 4,600,147 | | 7/1986 | Fukuta et al. ....................... 239/14.1 |
| 5,174,498 | | 12/1992 | Popovitz-Biro ....................... 239/2.1 |
| 5,357,865 | | 10/1994 | Mather ................................. 102/361 |
| 5,441,200 | * | 8/1995 | Rovella, II ............................ 239/2.1 |

* cited by examiner

*Primary Examiner*—Joseph D. Anthony
(74) *Attorney, Agent, or Firm*—McHale & Slavin, P.A.

(57) ABSTRACT

A method for artificially modifying the weather by seeding rain clouds of a storm with suitable cross-linked aqueous polymer. The polymer is dispersed into the cloud and the wind of the storm agitates the mixture causing the polymer to absorb the rain. This reaction forms a gelatinous substance which precipitate to the surface below. Thus, diminishing the clouds ability to rain.

7 Claims, No Drawings

METHOD OF MODIFYING WEATHER

FIELD OF THE INVENTION

This invention relates generally to weather modification and in particular to the use of polymers to absorb aqueous solutions capable of modifying a weather situation.

BACKGROUND OF THE INVENTION

Hurricanes, tropical storms, typhoons, and the like weather patterns can cause severe damage to land, buildings, and living creatures. The resulting damage from even an isolated event can be billions of dollars as evidenced by Hurricane Andrew.

Cloud seeding is a known process for artificially modifying the weather by injecting a composition into a cloud for formation of an ice freezing nuclei. Silver iodide is a well known substance used for cloud seeding. Ice freezing nuclei have the effect of creating rain, reducing hail, and possibly preventing rain by overseeding.

U.S. Pat. No. 5,174,498 discloses a cloud seeding material useful for seeding supercooled clouds in order to augment rainfall. The material used in seeding is defined as a aliphatic long-chain alcohol.

U.S. Pat. No. 4,600,147 discloses a cloud seeding method of inserting liquid propane from a rocket. The liquid propane is used to generate large numbers of ice crystals in supercooled clouds.

U.S. Pat. No. 5,357,865 discloses yet another method of cloud seeding. This invention includes the use of a pyrotechnic composition such as potassium chlorate or potassium perchlorate which act as nuclei for precipitable water drop formation.

U.S. Pat. No. 4,096,005 discloses a pyrotechnic cloud seeding composition comprising silver iodate and a fuel from the consisting of aluminum and magnesium.

Thus, the prior art teachings are directed to methods of creating rain. What is lacking in the art is a method of lessening the wind velocities of a storm.

SUMMARY OF THE INVENTION

The instant application discloses a method of modifying weather by seeding storm clouds with a polymer. The storm clouds are seeded by dispersing a superabsorbent polymer into the cloud in sufficient quantities to cause a large absorption of water. The reaction of the water with the polymer creates a gel-like substance that precipitates to the surface. Thus, causing an internal constriction with the cloud to lessen storm velocities.

A superabsorbent polymer is a resin capable of absorbing water up to several thousands times as its own weight. These superabsorbent polymers are prepared from water-soluble polymers, but have cross-linking structures which render the polymers water-insoluble. By taking water-soluble ethylenically unsaturated monomers which readily undergo vinyl polymerizaton, such as acrylamide, with the use of cross linking agents, a polymer can be produced that is of uniform small size, has a high gel capacity, is highly insoluble, but highly water swellable i.e. a superabsorbent polymer. (Gel capacity refers to the property of the water swollen polymer to resist viscosity changes as a result of mechanical working or milling.)

Superabsorbent polymers can be dehydrated to a powder. When the powder is added to an aqueous solution and agitated, the polymer is able to absorb many times its weight of the water molecules and a gel-like substance is formed. Superabsorbent polymers are particularly suited for uses where rapid sorption of aqueous fluid is desired or for uses where the swelling properties in water are employed.

Accordingly, it is an objective of the instant invention to present a method for artificially modifying weather wherein a polymer is used to cause wind dissipation by heaving weighting condensation with the clouds.

It is another objective of the instant invention to present a method for seeding a rain cloud with a cross-linked polymer such that the wind of the storm provides the agitation for the reaction of the polymer with the water.

It is an additional objective of the instant invention to present a method for modifying storms such that the solid end product is biodegradable and nonhazardous.

Other objectives and advantages of this invention will become apparent from the following description wherein are set forth, by way of example, certain embodiments of this invention.

DETAILED DESCRIPTION OF THE INVENTION

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

The present invention relates to a method for artificially modifying weather by solidifying portions of a cloud in a storm such as a hurricane, by introducing polymers into the cloud. This method utilizes "superabsorbent" aqueous based polymers, preferably cross linked modified polyacrylamides which can be used in any application where aqueous solidification is permissible. An example of a superabsorbent aqueous based polymer is manufactured by JRM Chemical Inc. under the trademark H-series.

In the present invention, a solid form of the superabsorbent polymer, such as a powder, is introduced into the rain clouds of a storm in a suitable manner, for instance a aircraft may traverse the storm and release the polymer seeds or they may be released from a seeding flare delivered from the surface or from an aircraft. The amount of polymer needed is predetermined based upon the size and severity of the storm along with the absorption capacity of the polymer used. The wind of the storm provides the agitation that causes the polymer to bind with the water forming a gel-like substance. As a result of this method, wind based water storms can be artificially modified.

The use of a biodegradable polymer allows for safe use of the ocean wherein the high salinity of the water will expedite the degradation of the material. Various biodegradable superabsorbent polymers include carboxy-methylcellulose, alginic acid, cross-linked starches, cross-linked polyamino acids and a cross-linked modified polyacrylamides.

In a dry state the preferred polymer may be considered a particle having a diameter less than 4000 microns but greater than 50 microns. In a swollen state the particle may have a diameter greater than three hundred times its weight. In a totally water-swollen state, the particles contain up to about 99.98 weight percent of water and a little as about 0.1 weight percent of polymer. Thus, such particles could hold from ten to thousands of times their own weight. By seeding a leading edge of a violent storm, such as a hurricane, the winds cause a mix of the material wherein moisture is absorbed by the material causing a shearing effect. The shearing effect causes the polymers to absorb, lose, and reabsorb water countless times. During this exchange, the weight of the water being transferred allowing for wind shearing that assists in lessening the velocity of the wind.

The shearing forces are affected by the nature of the interactions between the particles during such collisions. When attractive forces dominate, the particles will aggregate and the dispersion may destabilize.

Example: A hurricane is seeded with approximately 30,000 lbs of a superabsorbent aqueous based polymer by use of a transport plane flying through the leading edge of the storm. Within twenty seconds the polymer will obtain over 70 percent of its absorption capacity or nearly three hundred times its weight. The winds of the storm will continue to disperse the materials causing a form of internal flocculation disrupting the feeding nature of the storm. When presented close to land, the storm will not have sufficient time to reform to its previous strength.

It is to be understood that while I have illustrated and described certain forms of my invention, it is not to be limited to the specific forms herein described. It will be apparent to those skilled in the art that various changes may be made without departing from the scope of the invention and the invention is not to be considered limited to what is shown in the drawings and described in the specification.

What is claimed is:

1. A method for artificially modifying weather by seeding a rain cloud comprising:

forming an aqueous solidifier material capable of retaining over three hundred times its own weight in water, wherein said aqueous solidifier material is a cross-linked aqueous based polymer; dispersing said material into a suitable cloud formation, wherein the wind generated by the storm causes said solidifier to mix with rain to form a gel like substance;

said gel like substance being of sufficient weight to precipitate to the surface below thereby diminishing the velocity of the cloud.

2. The method of claim 1 wherein said dispersion of aqueous solidifier is from an aircraft traversing the cloud.

3. The method of claim 1 wherein said dispersion of aqueous solidifier is from the surface below.

4. The cross-linked aqueous polymer of claim 1 wherein said polymer is a cross-linked modified polyacrylamides.

5. The cross-linked polymer of 1 wherein said material is between 50 and 4000 microns.

6. The method of claim 1 wherein the amount of said aqueous solidifier needed is precalculated based upon the size of the storm and the absorption properties of said aqueous solidifier.

7. The methods of claim 1 wherein said aqueous solidifier is biodegradable and nonhazardous.

* * * * *